2,795,605
Patented June 11, 1957

2,795,605

PROCESS FOR THE PRODUCTION OF TYROSINE

Bruno Vassel, Deerfield, Ill., assignor to International Minerals & Chemical Corporation, a corporation of New York No Drawing. Application January 17, 1955,
Serial No. 482,420

6 Claims. (Cl. 260—519)

This invention relates to a process for the production of tyrosine. More particularly, this invention relates to a process for the production of an improved type crystal of tyrosine of high purity.

Recently tyrosine is being employed in new uses in the pharmaceutical field and it has become desirable to produce high purity tyrosine in commercial quantities from raw materials containing it. There are several well known methods for producing tyrosine. One source is the mixture of tyrosine and leucine which is separated from proteinaceous hydrolyzates in the processing of the hydrolyzates to recover glutamic acid. For example, tyrosine is extracted from the tyrosine-leucine mixture, and is crystallized and separated from the liquor. Difficulty has been encountered at this point because the crystalline tyrosine upon filtration or centrifuging, forms a thin unpenetrable film in the filter presses and the centrifuge baskets. In addition, the cake is not glossy white but is a dull grey color and for this reason the tyrosine is not satisfactory for certain pharmaceutical purposes.

The reason for the aforementioned difficulties has been found to be due primarily to the inherent shape of the crystal formed in previously known tyrosine crystallization processes. The crystals are typically aggregates of very small, short prismatic crystals. This conventional tyrosine crystal is normally produced when the pH of a solution containing tyrosine is adjusted near the isoelectric point of tyrosine, for example, a pH of between about 4 and about 6.5 at which point tyrosine crystallizes and is separated from the solution. This method assures the product comprising essentially the above type of prismatic crystal.

It is an object of the instant invention to provide a producing tyrosine crystals having improved physical properties.

It is a further object of the instant invention to produce a crystalline form of tyrosine which is granular in form and which is free-flowing.

It is a further object of the instant invention to produce a novel type of crystalline tyrosine which is suitable for certain pharmaceutical purposes.

Further objects of this invention will become more apparent upon a fuller understanding of the same as hereinafter described.

It has been found that tyrosine which is granular free-flowing and easily filtered or centrifuged is produced by crystallizing the tyrosine crystals from a solution having a pH between about 1.3 and about 2.2 under certain conditions. More specifically, the aforesaid desirable crystals are produced if the pH of a hot aqueous solution containing between about 5 and about 15 grams per liter of tyrosine and having a pH of between about 1.3 and about 2.2 is cooled slowly to crystallize tyrosine. While it is preferred to use concentrated hydrochloric acid, any mineral acid nonoxidizing under the conditions obtaining may be employed. The term "nonoxidizing mineral acid" as herein used in the description and claims refers to a mineral acid nonoxidizing under the conditions obtaining; the term "tyrosine" as used in the description in claims, refers to L-tyrosine, that is, the tyrosine having the natural optical rotation.

These new type crystals of tyrosine are produced by mixing between about 5 grams and about 15 grams of ordinary tyrosine with about one liter of water and adjusting the pH of this tyrosine-containing solution to between about 1.3 and about 2.2, preferably between about 1.5 and about 2.0. The adjusted solution is heated so that all of the tyrosine dissolves, and the hot solution is filtered. The resulting solution is allowed to cool at an average rate of less than about 0.25 degrees per minute and the new type tyrosine crystallizes from the cooled solution.

The improved type of tyrosine crystals are glossy white, fine needles which tend to form aggregates or rosettes. The crystals have a size up to about 2.5 millimeters by about 0.015 millimeter and average in size about 0.2 millimeter by about 0.015 millimeter. The ratio of length to width ranges from about 20 to 1 to about 5 to 1. These tyrosine crystals are anhydrous and free-flowing.

The tyrosine crystals conventionally produced are grey-white semi-amorphous aggregates. The average crystal side is about 7.5 microns by about 2 microns. The ratio of length to width ranges from between about 6 to 1 to about 1 to 1. Although the new improved type crystals may belong to the same crystal system as the conventionally produced tyrosine, they do not have the same crystal form.

As previously stated a tyrosine-containing solution of between about 5 grams per liter and about 15 grams per liter of tyrosine is employed but preferably between about 8 grams and about 15 grams per liter is employed for the production of these crystals. The tyrosine-containing solution is heated so that substantially all of the tyrosine dissolves. It is generally necessary, depending upon the concentration of tyrosine in the solution, to heat the solution to above about 50° C. in order to dissolve all of the tyrosine. The solution is preferably heated to a temperature between about 70° C. and about 90° C. The hot solution is filtered or centrifuged in order to separate any solid material. The filtrate is allowed to cool slowly to about atmospheric temperature or to cool over a range of about 25° C. or more. For example, when the solution is filtered at about 75 °C. the resulting solution is allowed to cool to a temperature between about atmospheric temperature and about 50° C.

In a batch process for the production of this improved type of tyrosine crystals, it is preferred to adjust the aqueous solution containing between about 8 grams per liter and about 15 grams per liter of tyrosine to a pH of between about 1.5 and about 2.0. Decolorizing carbon is added to the solution, if desired, and the resulting solution heated to a temperature between about 70° C. and about 90° C. If decolorizing carbon has been added to the solution it is maintained at the elevated temperature for between about ten and about twenty minutes with stirring, and the resulting solution is filtered while hot. The filtrate is allowed to cool slowly, and the tyrosine crystals are separated by any convenient method, for example, by filtration or centrifuging. The resulting filtrate has a pH of about 2 and may be recycled as the solvent for the next batch to tyrosine or it is recycled where a continuous process is employed. The tyrosine obtained is of substantially 100% purity.

The following examples are given merely to facilitate a clearer understanding of this invention and are not intended as a limitation of the invention.

*Example I*

About 250 grams of tyrosine was mixed with about 32 liters of water and about 120 milliliters of 37% aqueous hydrochloric acid. The resulting solution had a pH of about 1.8. About 12.5 grams of decolorizing carbon was added to the solution which was then heated to a temperature of between about 80° C. and about 85° C. The resulting hot solution was stirred and maintained at the above temperature for about ten minutes, then filtered while hot. The resulting filtrate was allowed to cool at an average rate of about 0.2 degree per minute by standing without agitation. The tyrosine crystals which formed were filtered off, washed with about 500 milliliters of water, and dried at about 105° C. The recovery of tyrosine was about 60% and the tyrosine had a purity of between about 99% and about 100%.

*Example II*

About 115 grams of tyrosine was dissolved in about 32 liters of tyrosine filtrate from a previous crystallization. Concentrated aqueous hydrochloric acid was added to the solution in sufficient amount to obtain a pH of about 1.8. The resulting solution was heated to between about 80° C. and about 85° C., and about 5 grams of decolorizing carbon was added. The hot solution was stirred at the above temperature for about ten minutes and was filtered while hot. The resulting filtrate was allowed to cool at an average rate of about 0.25 degree per minute without agitation. The needles of tyrosine were filtered off, washed with water, and dried at 150° C. Tyrosine recovery was about 98% and the tyrosine obtained was substantially 100% pure.

This application is a continuation-in-part of application Serial No. 303,171, filed August 7, 1952, by applicant, now abandoned, and entitled A Process for the Production of Tyrosine.

Having thus fully described and illustrated the character of the instant invention, what is desired to be secured by Letters Patent is:

1. A process for the production of an improved form of tyrosine crystal which comprises adding to an aqueous solution containing between about 5 grams per liter and about 15 grams per liter of tyrosine, sufficient non-oxidizing mineral acid to adjust the pH to between about 1.3 and about 2.2, heating the adjusted solution to a temperature of between about 50° C. and about 100° C. until substantially all of the tyrosine has dissolved therein, allowing the hot solution to cool at an average rate less than about 0.25 degree per minute to a temperature between about atmospheric temperature and about 60° C. respectively, and separating tyrosine crystals from the cooled solution after crystallization.

2. A process for the production of an improved form of tyrosine crystal which comprises adjusting an aqueous solution containing between about 5 grams per liter and about 15 grams per liter of tyrosine to a pH between about 1.5 and about 2.0, heating the resulting solution to a temperature between about 50° C. and about 100° C., until substantially all of the tyrosine has dissolved therein, allowing the resulting solution to cool without agitation at an average rate of less than about 0.25 degree per minute to between about atmospheric temperature and about 60° C. respectively, and separating tyrosine crystals from the resulting cooled solution.

3. A process for the production of an improved form of tyrosine crystal, which comprises admixing tyrosine with an aqueous solution selected from the group consisting of water and a tyrosine mother liquor to form an aqueous solution containing between about 5 grams and about 15 grams per liter of tyrosine, adjusting the tyrosine solution to a pH of between about 1.3 and about 2.2 with concentrated hydrochloric acid, heating the resulting solution to a temperature between about 50° C. and about 100° C., until substantially all of the tyrosine has dissolved therein, allowing the resulting solution to cool at an average rate of less than about 0.25 degree per minute to a temperature between about atmospheric temperature and about 60° C. respectively, separating the tyrosine crystals from the cooled solution, and recycling the mother liquor from which the tyrosine crystals have been separated to the step at which the tyrosine is admixed with aqueous solution.

4. A continuous process for the production of an improved form of tyrosine crystal which comprises admixing solid phase tyrosine with an aqueous solution selected from the group consisting of water and a tyrosine mother liquor to form an aqueous solution containing between about 5 grams and about 15 grams per liter of tyrosine, adjusting the tyrosine solution to a pH of between about 1.3 and about 2.2 with concentrated hydrochloric acid, heating the resulting solution to a temperature between about 70° C. and about 90° C., until substantially all of the tyrosine has dissolved therein, allowing the resulting solution to cool at an average rate of less than about 0.25 degree per minute to a temperature between about atmospheric temperature and about 60° C. respectively, separating the tyrosine crystals from the cooled solution, and continuously recycling the mother liquor from which the tyrosine crystals have been separated to the step at which the tyrosine is admixed with aqueous solution.

5. A process for the production of an improved form of tyrosine crystal which comprises admixing tyrosine with an aqueous solution selected from the group consisting of water and a tyrosine aqueous mother liquor to form an aqueous solution containing between about 8 grams and about 15 grams per liter of tyrosine, adjusting the tyrosine solution to a pH of between about 1.5 and about 2.0 with concentrated hydrochloric acid, heating the resulting solution to a temperature between about 50° C. and about 100° C., until substantially all of the tyrosine has dissolved therein, allowing the resulting solution to cool at an average rate of less than about 0.25 degree per minute to a temperature between about atmospheric temperature and about 60° C. respectively, separating tyrosine crystals from the cooled solution, and recycling the mother liquor from which the tyrosine crystals have been separated to the step at which the tyrosine is admixed with aqueous solution.

6. A continuous process for the production of an improved form of tyrosine crystal which comprises admixing solid phase tyrosine with an aqueous solution selected from the group consisting of water and a tyrosine aqueous mother liquor to form an aqueous solution containing between about 8 grams and about 15 grams tyrosine per liter, adjusting the tyrosine solution to a pH of between about 1.5 and about 2.0 with concentrated hydrochloric acid, heating the resulting solution to a temperature between about 70° C. and about 90° C. until substantially all of the tyrosine has dissolved therein, allowing the resulting solution to cool at an average rate of about 0.1 degree per minute to a temperature between about atmospheric temperature and about 60. C. respectively, separating tyrosine crystals from the cooled solution, and continuously recycling the mother liquor from which the tyrosine crystals have been separated to the step at which the tyrosine is admixed with aqueous solution.

References Cited in the file of this patent

UNITED STATES PATENTS

| 2,009,868 | Barnett | July 30, 1935 |
| 2,683,739 | Weidman | July 13, 1954 |